United States Patent
Wang et al.

(10) Patent No.: US 12,308,906 B2
(45) Date of Patent: May 20, 2025

(54) RADIO ASTRONOMY INTERFERENCE SIGNAL REDUCTION METHOD, APPARATUS, AND SYSTEM AND COMPUTER DEVICE

(71) Applicant: ZHEJIANG LAB, Hangzhou (CN)

(72) Inventors: Yu Wang, Hangzhou (CN); Ran Duan, Beijing (CN); Yi Feng, Hangzhou (CN); Di Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 146 days.

(21) Appl. No.: 18/242,531

(22) Filed: Sep. 6, 2023

(65) Prior Publication Data
US 2024/0313830 A1  Sep. 19, 2024

(30) Foreign Application Priority Data
Mar. 15, 2023  (CN) .......................... 202310276003.7

(51) Int. Cl.
*H04L 5/12*  (2006.01)
*H04B 7/0426*  (2017.01)
*H04B 7/08*  (2006.01)
*H04B 17/21*  (2015.01)

(52) U.S. Cl.
CPC ........... *H04B 7/043* (2013.01); *H04B 7/0857* (2013.01); *H04B 17/22* (2023.05)

(58) Field of Classification Search
CPC ...... H04B 7/043; H04B 7/0857; H04B 17/22; H04B 1/10; H04B 1/1036; Y02D 30/70
USPC .......................................................... 375/262
See application file for complete search history.

(56) References Cited

U.S. PATENT DOCUMENTS

2014/0066113 A1* 3/2014 Zhuang ............... H04B 7/0617
455/501
2022/0247471 A1* 8/2022 van Houtum ........ H04B 7/0842

* cited by examiner

*Primary Examiner* — Helene E Tayong (57) ABSTRACT

The present disclosure relates to a radio astronomy interference signal reduction method, apparatus, and system and a computer device. The method includes: acquiring at least two beam signals, and obtaining a covariance matrix between all the beam signals according to the beam signals, wherein the beam signals include subsignals from at least two directions; performing eigen-decomposition processing on the covariance matrix to obtain signal eigenvectors and eigenvalues corresponding to the subsignals, and extracting interference eigenvectors corresponding to interference signals from the signal eigenvectors based on the eigenvalues; and obtaining a target reduction result for the interference signals according to the signal eigenvectors and the interference eigenvectors. With the method, the problem of low accuracy of radio astronomy interference signal reduction in the related art can be solved.

10 Claims, 4 Drawing Sheets

RADIO ASTRONOMY INTERFERENCE SIGNAL REDUCTION METHOD, APPARATUS, AND SYSTEM AND COMPUTER DEVICE

CROSS REFERENCE TO RELATED APPLICATIONS

This application claims priority under 35 U.S.C. § 119 to Chinese Patent Application No. 202310276003.7, filed on Mar. 15, 2023, the entire content of which is incorporated herein in its entirety.

TECHNICAL FIELD

The present disclosure relates to the field of signal processing technologies, and in particular, to a radio astronomy interference signal reduction method, apparatus, system and a computer device.

BACKGROUND

In today's radio astronomy technology, a signal received by a telescope may inevitably be interfered by various radio waves. For example, the Five-hundred-meter Aperture Spherical radio Telescope (FAST) operates at a frequency ranging from 70 MHz to 3 GHZ, which is crowded with a lot of radio services. Therefore, it is highly susceptible to interference from various radio signals during FAST observation.

At present, although a Radio Quiet Zone (RQZ) has been established around the FAST to effectively reduce the influence of surrounding ground interference sources on telescope observation, due to the extremely high sensitivity of the FAST, there are still certain interference signals in observed data, of which some are known interference source signals, such as satellite and civil aviation signals, and others are interference signals from unknown sources. This increases the difficulty of interference reduction for acquired radio signals. In the related art, for the above interference signals, the interference signals in the data are generally identified and marked by manpower. As a result, identification results of the interference signals vary from person to person and artificial errors may be introduced, leading to inconsistent results of the interference signals and low accuracy of interference signal reduction.

At present, no effective solution has been proposed for the problem of low accuracy of radio astronomy interference signal reduction in the related art.

SUMMARY

Based on the above, there is a need to provide a radio astronomy interference signal reduction method, apparatus, system and a computer device.

In the first aspect, the present disclosure provides a radio astronomy interference signal reduction method. The method includes:
- acquiring at least two beam signals, and obtaining a covariance matrix between all the beam signals according to the beam signals, wherein the beam signals include subsignals from at least two directions;
- performing eigen-decomposition processing on the covariance matrix to obtain signal eigenvectors and eigenvalues corresponding to the subsignals, and extracting interference eigenvectors corresponding to interference signals from the signal eigenvectors based on the eigenvalues; and
- obtaining a target reduction result for the interference signals according to the signal eigenvectors and the interference eigenvectors.

In an embodiment, the interference eigenvectors form an interference subspace; and the obtaining the target reduction result for the interference signals according to the signal eigenvectors and the interference eigenvectors includes:
- calculating an interference subspace projection matrix based on the interference subspace;
- performing projection transformation processing on the covariance matrix based on the interference subspace projection matrix to obtain a covariance projection matrix;
- subtracting the covariance projection matrix from the covariance matrix to obtain the target reduction result.

In an embodiment, the subtracting the covariance projection matrix from the covariance matrix to obtain the target reduction result includes:
- subtracting the covariance projection matrix from the covariance matrix to obtain a spatially filtered covariance matrix;
- performing signal recovery processing based on the spatially filtered covariance matrix to obtain a de-interference beam signal, and obtaining the target reduction result based on the de-interference beam signal.

In an embodiment, the extracting the interference eigenvectors corresponding to the interference signals from the signal eigenvectors based on the eigenvalues includes:
- acquiring a preset eigenvalue threshold;
- comparing each of the eigenvalues with the preset eigenvalue threshold, determining interference eigenvalues from the eigenvalues based on comparison results, and determining the corresponding interference eigenvectors from the signal eigenvectors based on the interference eigenvalues.

In an embodiment, the acquiring the at least two beam signals further includes:
- acquiring at least two initial beam signals;
- performing system noise calibration processing on each of the initial beam signals to obtain the beam signals; wherein the system noise calibration processing includes removing baselines in the beam signals.

In an embodiment, the beam signals include frequency information, and the obtaining the covariance matrix between all the beam signals according to the beam signals includes:
- classifying the beam signals into at least one frequency channel according to the frequency information, and extracting frequency data corresponding to the frequency channel in the beam signals according to the frequency information;
- inputting the frequency data into the corresponding frequency channel for calculation to obtain the covariance matrix.

In an embodiment, the acquiring the at least two beam signals includes:
- acquiring a preset time interval;
- acquiring the at least two beam signals based on the preset time interval.

In a second aspect, the present disclosure provides a radio astronomy interference signal reduction apparatus. The apparatus includes:
- an acquisition module configured to acquire at least two beam signals, and obtain a covariance matrix between all the beam signals according to the beam signals, wherein the beam signals include subsignals from at least two directions;

a calculation module configured to perform eigen-decomposition processing on the covariance matrix to obtain signal eigenvectors and eigenvalues corresponding to the subsignals, and extract interference eigenvectors corresponding to interference signals from the signal eigenvectors based on the eigenvalues;

a generation module configured to obtain a target reduction result for the interference signals according to the signal eigenvectors and the interference eigenvectors.

In a third aspect, the present disclosure provides a radio astronomy interference signal reduction system. The system includes: a radio astronomy device and a main control device;

the radio astronomy device being configured to receive at least two beam signals and transmit the beam signals to the main control device; and the main control device being configured to perform steps of the method as described above.

In a fourth aspect, the present disclosure further provides a computer device. The computer device includes a memory and a processor, the memory stores a computer program, and the processor, when executing the computer program, implements the following steps:

acquiring at least two beam signals, and obtaining a covariance matrix between all the beam signals according to the beam signals, wherein the beam signals include subsignals from at least two directions;

performing eigen-decomposition processing on the covariance matrix to obtain signal eigenvectors and eigenvalues corresponding to the subsignals, and extracting interference eigenvectors corresponding to interference signals from the signal eigenvectors based on the eigenvalues;

obtaining a target reduction result for the interference signals according to the signal eigenvectors and the interference eigenvectors.

According to the radio astronomy interference signal reduction method, apparatus, and system and the computer device described above, firstly, a covariance matrix between acquired beam signals is calculated according to the beam signals. Then, eigen-decomposition processing is performed on the covariance matrix to obtain eigenvectors and eigenvalues of signals in different directions, and interference eigenvectors are extracted according to the eigenvalues. Finally, a target reduction result is obtained according to the signal eigenvectors and the interference eigenvectors. According to the present disclosure, interference signals can be removed by using data of a plurality of beams, without affecting astronomical signals. Further, in the present disclosure, the interference eigenvectors corresponding to the interference signals are extracted from the signal eigenvectors based on the eigenvalues, thereby preventing errors and data losses caused by various factors to some extent, solving the problem of low accuracy of radio astronomy interference signal reduction in the related art, and implementing a highly accurate and efficient radio astronomy interference signal reduction method.

DETAILED DESCRIPTION OF THE EMBODIMENTS

In order to make the objectives, technical solutions, and advantages of the present disclosure clearer, the present disclosure will be further described in detail below in conjunction with the accompanying drawings and embodiments. It should be understood that specific embodiments described herein are intended only to explain the present disclosure, and do not limit the present disclosure.

Figure 1:
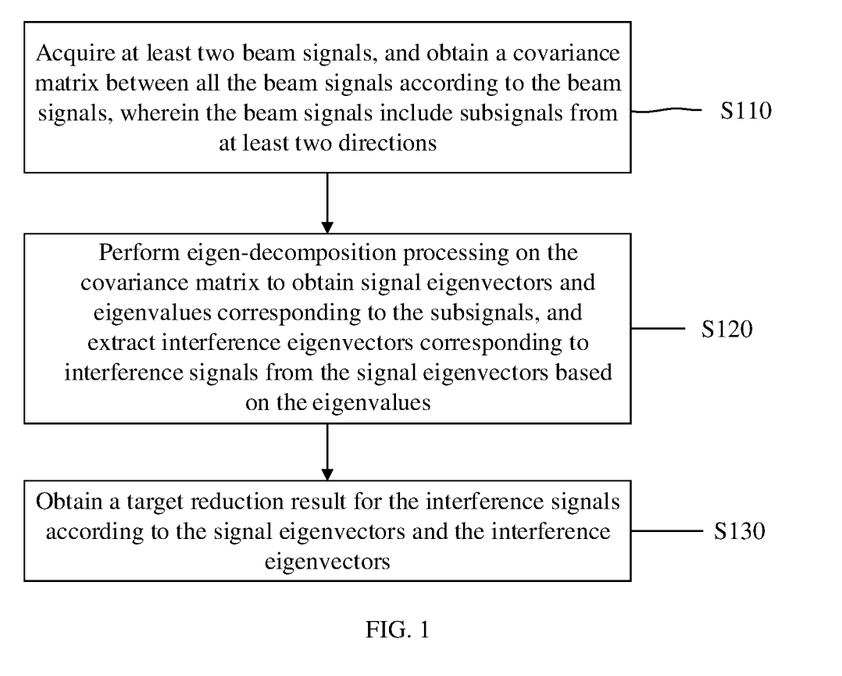
FIG. 1 is a schematic flowchart of a radio astronomy interference signal reduction method according to an embodiment.

In an embodiment, as shown in FIG. 1, a radio astronomy interference signal reduction method is provided. In this embodiment, for example, the method is applied to a terminal. It may be understood that the method may alternatively be applied to a server or a system including a terminal and server, and be implemented through interaction between the terminal and the server. FIG. 1 is a flowchart of a radio astronomy interference signal reduction method according to embodiments of the present disclosure, including the following steps.

In step S110, at least two beam signals are acquired, and a covariance matrix between all the beam signals is obtained according to the beam signals, wherein the beam signals include subsignals from at least two directions.

Data of beam signals by a radio astronomy device such as a radio astronomy telescope multi-beam receiver may be acquired. Each beam signal can receive subsignals in a plurality of directions, but when there is only one beam, it is impossible to distinguish which direction the subsignal comes from. Therefore, the direction from which the above subsignal comes can be obtained by solving the covariance matrix of a plurality of beam signals and performing eigen-decomposition. Further, a plurality of beam data recorded at a same time can be imported to a same directory deployed on the above server or terminal as an input file thereof, which is in an astronomical standard fits file format. Data of the radio astronomy telescope multi-beam receiver includes time-frequency two-dimensional spectral data, polarization and beam information, and the like. Specifically, taking a FAST as an example, a 19-beam receiving system that the FAST is currently equipped with can simultaneously record data of 19 beams, and after acquiring beam signals, obtain a covariance matrix between all the beam signals according to the beam signals. The covariance matrix is defined as:

$$C = \begin{bmatrix} S_1 S_1^* & \cdots & S_N S_1^* \\ \vdots & \ddots & \vdots \\ S_1 S_N^* & \cdots & S_N S_1^* \end{bmatrix}$$

where C denotes an inter-beam covariance matrix, $S_i$ denotes strength of a signal received by an $i^{th}$ beam, and $S_i^*$ denotes a conjugate thereof. Each element in the covariance matrix is covariance between the beams, which includes magnification and delay information of different beams for this signal. Such information can reflect the direction of the signal, that is, a spatial feature.

In step S120, eigen-decomposition processing is performed on the covariance matrix to obtain signal eigenvectors and eigenvalues corresponding to the subsignals, and interference eigenvectors corresponding to interference signals are extracted from the eigenvectors based on the eigenvalues.

Eigen-decomposition for the inter-beam covariance matrix may be expressed as:

$$C = Q\Lambda Q^H = (Q_I / Q_N) \begin{bmatrix} \Lambda_I + \sigma_N^2 E_q & 0 \\ 0 & \sigma_N^2 E_{p-q} \end{bmatrix} \begin{pmatrix} Q_I^H \\ Q_N^H \end{pmatrix}$$

where Q denotes an eigenvector, $Q^H$ denotes conjugate transpose thereof, $\Lambda$ denotes an eigenvalue, the subscript I and the subscript N denote components of interference and noise respectively, and $\sigma_N$ denotes a standard deviation of noise power, where $Q_I$ denotes an interference eigen-subspace, E denotes a unit matrix, q denotes a quantity of Radio Frequency Interference (RFI) components in the matrix, p denotes a total number of beams, which also denotes a number of orders of the covariance matrix, and p-q denotes the remaining components, namely the astronomical signals and noise. After the eigen-decomposition processing, the signal eigenvector and the eigenvalue corresponding to the signal in each direction are obtained. The eigenvalue is signal energy in a corresponding signal direction. The interference eigenvector corresponding to the interference signal is determined from the signal eigenvector based on the eigenvalue and extracted. In the present disclosure, according to respective characteristics of an astronomical signal and a noise signal, it is determined whether a signal is an interference noise signal, so that the interference signal can be removed without affecting the astronomical signal, and losses of astronomical signal data are prevented. On the other hand, the noise signal can be quickly found, which improves data processing efficiency.

In step S130, a target reduction result for the interference signals is obtained according to the signal eigenvectors and the interference eigenvectors.

The interference eigenvectors are eigenvectors for the interference signals, and the interference eigenvectors corresponding to the interference signals are extracted from the signal eigenvectors, so as to obtain the above target reduction result. The target reduction result is a spatially filtered beam signal.

Through step S110 to step S130, the interference eigenvectors corresponding to the interference signals are determined from the signal eigenvectors through the eigenvalues and extracted, and then the target reduction result for the interference signals is calculated according to the extracted interference eigenvectors and the signal eigenvectors. The determination of the interference eigenvectors corresponding to the interference signals through the eigenvalues abandons methods that require a lot of manpower to identify and mark interference in data, and prevents artificial errors caused by introduction of the manpower, thereby leading to inconsistent results. Further, the present disclosure provides a method that can efficiently and accurately realize radio astronomy interference signal reduction. Automatic determination of the interference eigenvectors and reduction of the interference signals can not only reduce errors, but also improve efficiency of data processing.

In an embodiment, the interference eigenvectors form an interference subspace, and the above radio astronomy interference signal reduction method further includes the following steps:

calculating an interference subspace projection matrix based on the interference subspace; performing projection transformation processing on the covariance matrix based on the interference subspace projection matrix to obtain a covariance projection matrix; and subtracting the covariance projection matrix from the covariance matrix to obtain the target reduction result.

Specifically, the interference subspace projection matrix is calculated based on the interference subspace, and a calculation formula is as follows:

$$P_I = Q_I (Q_I Q_T)^{-1} Q_T = Q_I Q_T$$

$P_I$ denotes the interference subspace projection matrix, which may be simplified as $Q_I Q_I^T$ because $Q_I$ denotes a unit vector. Further, after the interference subspace projection matrix is obtained, projection transformation processing is performed on the above covariance matrix based on the interference subspace projection matrix to obtain the covariance projection matrix. That is, the covariance matrix is multiplied by the interference subspace projection matrix, which is $P_I C P_I^T$. After the interference eigenvectors corresponding to the interference signals are extracted, the interference subspace projection matrix is calculated by using the definition of projection in linear algebra, equivalent to constructing a spatial filter for the beam signals acquired. Components in an interference subspace projection direction are subtracted from the inter-beam covariance matrix to obtain a spatially filtered inter-beam covariance matrix, that is, the target reduction result for the interference signals. Specifically, that components in an interference subspace projection direction are subtracted from the inter-beam covariance matrix may be expressed as:

$$\tilde{C} = C - P_I C P_I^T$$

where $\tilde{C}$ denotes the spatially filtered inter-beam covariance matrix, whose diagonal value is the square of each spatially filtered beam value, $P_I$ denotes the interference subspace projection matrix, and C denotes the inter-beam covariance matrix. As can be seen, in the present disclosure, the interference subspace projection matrix is obtained through basic projection definition, which is equivalent to constructing a spatial filter. With this method, components of the interference signals can be quickly eliminated in real time without affecting the astronomical signals. In the present disclosure, the interference subspace projection matrix is selected, and is multiplied by the covariance matrix to obtain components of the covariance matrix in an interference subspace direction. Subtracting the components is equivalent to removing the interference signals. Interference components in the inter-beam covariance matrix can be quickly and conveniently removed by using the definition of projection, which is convenient to obtain an interference reduction result based on the covariance matrix with the interference components removed in subsequent steps.

In an embodiment, the above radio astronomy interference signal reduction method further includes:

subtracting the covariance projection matrix from the covariance matrix to obtain a spatially filtered covariance matrix; and performing signal recovery processing based on the spatially filtered covariance matrix to obtain a de-interference beam signal, and obtaining the target reduction result based on the de-interference beam signal.

Specifically, after the spatially filtered covariance matrix is obtained, signal recovery processing is performed based on the spatially filtered covariance matrix, so as to obtain a spatially filtered result, and the signal of each beam is recovered from the covariance matrix with the interference components removed, which is written into the standard fits file respectively, so as to obtain the spatially filtered result. A diagonal of the covariance matrix is used to characterize autocorrelation of each beam, and the signal of each beam can be recovered by calculating a square root of the diagonal of the filtered covariance matrix. It is to be noted that, in an actual operation, after a plurality of beam signals are acquired, the beam signals are required to be classified into different frequency channels according to frequency information in the beam signals for separate calculation, and the de-interference beam signal is obtained after the above calculation. The de-interference beam signal is a calculation result of each beam channel, and the above target reduction result is obtained by summarizing and reorganizing the calculation results of all the beam channels.

In an embodiment, the above radio astronomy interference signal reduction method further includes:

acquiring a preset eigenvalue threshold; and comparing each of the eigenvalues with the preset eigenvalue threshold, determining interference eigenvalues from the eigenvalues based on comparison results, and determining the corresponding interference eigenvectors from the signal eigenvectors based on the interference eigenvalues.

Specifically, in the present disclosure, whether a component in the beam signal is a component of an interference signal is determined according to magnitude of an eigenvalue. Since an astronomical signal is generally very weak and may be buried in noise, while the interference signal is very strong, when there is an interference signal, a maximum eigenvalue may be many orders of magnitude higher than the other signal eigenvalues. The setting of the eigenvalue threshold is generally related to interference intensity in an actual situation. Generally, the eigenvalue of the interference signal is several orders of magnitude or even hundreds of orders of magnitude higher than other eigenvalues, and the setting of the eigenvalue threshold is required to be determined according to an actual application environment. Therefore, according to this principle, each eigenvalue is compared with the preset eigenvalue threshold. If the eigenvalue is greater than the eigenvalue threshold, it may be determined that the eigenvalue is an interference eigenvalue, and a corresponding interference eigenvector is determined from the signal eigenvector according to the interference eigenvalue. As can be seen, in the present disclosure, interference components in a beam are separated by using respective characteristics of the astronomical signal and the interference signal, so as to achieve interference reduction, recover useful data covered by interference, and improve data quality and observation efficiency of the telescope. Further, manpower is not introduced into the interference reduction method in the present disclosure to mark and reduce the interference signal, which not only reduces labor cost, but also prevents errors and data losses caused by human factors.

Figure 2:
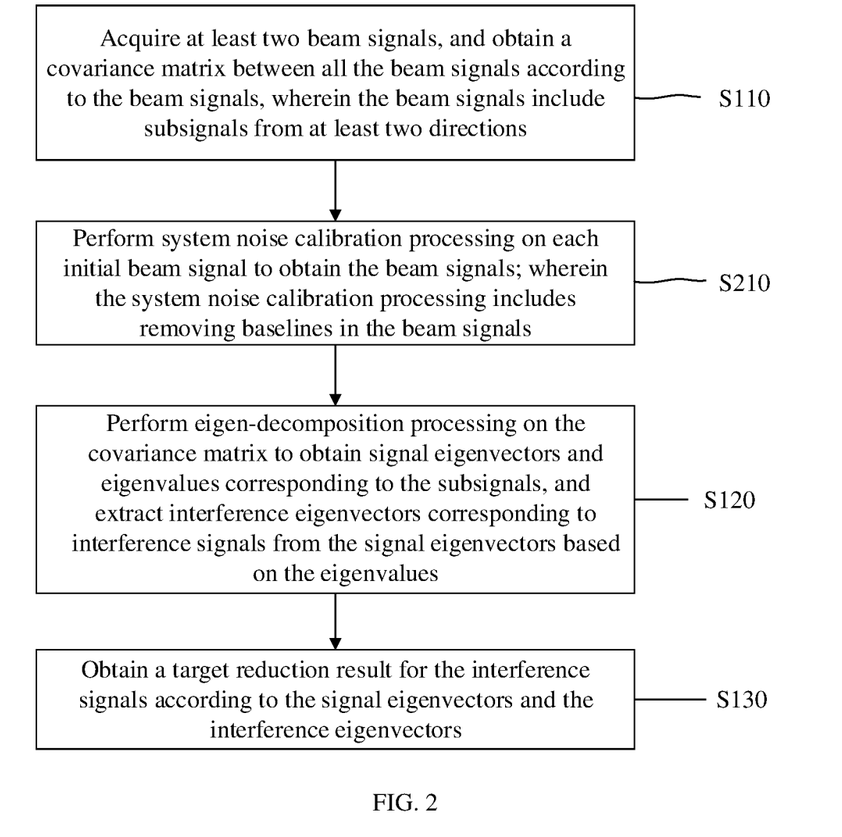
FIG. 2 is a schematic flowchart of a radio astronomy interference signal reduction method according to another embodiment.

In an embodiment, a radio astronomy interference signal reduction method is provided. FIG. 2 is a flowchart of another radio astronomy interference signal reduction method according to the present disclosure. As shown in the figure, the process includes the following steps.

In step S210, at least two initial beam signals are acquired; and system noise calibration processing is performed on each of the initial beam signals to obtain the beam signals; wherein the system noise calibration processing includes removing baselines in the beam signals.

Specifically, system noise calibration is required after acquisition of a plurality of beam data, and the influence of differences between different beams on the signals is eliminated by removing the baselines in the beam signals. The method for removing the baselines includes asymmetric penalized least squares. Firstly, an initial value is given, and then a difference between a fitted baseline and original data and smoothness of the baseline are calculated based on the initial value. Then, parameters are updated and a new baseline is calculated. The parameters may be updated by using a sigmoid function. The above method is repeated until the threshold is met or a maximum number of times of iteration is reached. With the method, the parameters can be changed through iteration, so that the fitted baseline is constantly approaching the original data and becomes smooth, to perform system noise calibration on acquired original beam signals and remove the influence of differences between different beams on the signals, which is conducive to subsequent steps such as identification and elimination of the interference signals.

In an embodiment, the above radio astronomy interference signal reduction method further includes:

classifying the beam signals into at least one frequency channel according to the frequency information, and extracting frequency data corresponding to the frequency channel in the beam signals according to the frequency information; and inputting the frequency data into the corresponding frequency channel for calculation to obtain the covariance matrix.

Specifically, taking the FAST as an example, there is a 19-beam receiver, each beam is equivalent to a feed source to receive signals in the sky at the same time, there are a total of 19 signals, and 19 one-dimensional time sequences are obtained after sampling. Fast Fourier transform is performed on each of the 19 time sequences to obtain signals of different frequency channels, thereby becoming 19 two-dimensional matrices (the vertical direction indicates time, and the horizontal direction indicates frequencies). The time is called samples and the frequencies are called channels. Finally, data of a same frequency channel in 19 beams is extracted, and the above calculation is performed separately for each frequency channel, such as solving the covariance matrix, finding the interference subspace, and performing spatial filtering. After the calculation for each channel is completed separately, filtered data is obtained, and the filtered data in all channels are summarized and reorganized to obtain the beam signals after interference removal. With the above method, the acquired beam signals can be calculated from the perspective of frequencies, data at a same frequency can be calculated separately to remove the interference eigenvectors more quickly and accurately, and after the calculation is completed, the filtered data is summarized and reorganized, which improves efficiency and accuracy of the calculation.

In an embodiment, the above radio astronomy interference signal reduction method further includes:

acquiring a preset time interval; and
acquiring the at least two beam signals based on the preset time interval.

Specifically, in consideration of the fact that signal sources corresponding to the acquired beam signals may be moving, the beam signals collected in the present disclosure are also required to be updated at a preset time interval to adapt to a new signal environment. The time interval may be preset by staff according to an actual situation. For example, the time interval may be preset to about 40 s. In this process, the interference signal is relatively stable, and the filtering is relatively accurate. Further, in the process of periodically acquiring the above plurality of beam signals through the above steps, the interference signals in the beam signals can be removed in real time through any of the above method embodiments, and finally a corresponding target elimination result for the interference signals can be obtained. In the present disclosure, periodic acquisition of the beam signals can be better applied to an actual application environment, preventing errors caused by the movement of the signal sources, and filtering results can be updated in time as the signal sources change.

Figure 3:
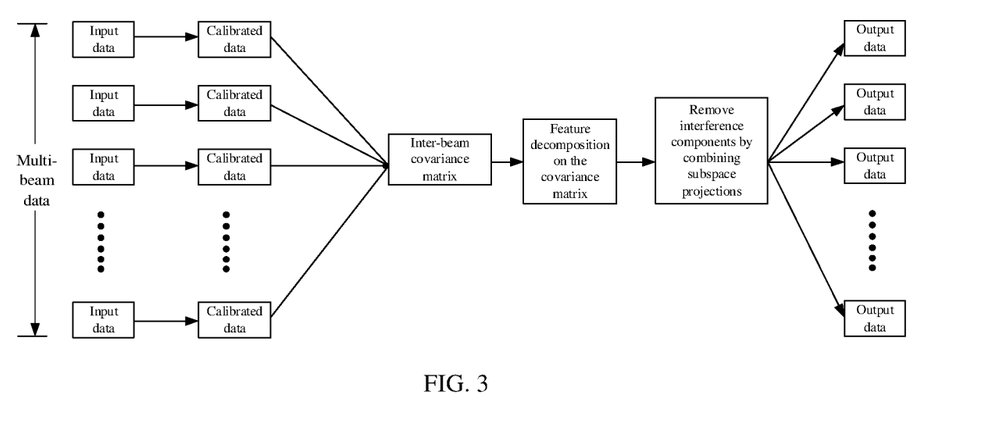
FIG. 3 is a schematic flowchart of a radio astronomy interference signal reduction method according to yet another embodiment.

This embodiment further provides a specific embodiment of a radio astronomy interference signal reduction method. As shown in FIG. 3, FIG. 3 is a schematic flowchart of a radio astronomy interference signal reduction method according to yet another embodiment.

Firstly, the data of the radio astronomy telescope multi-beam receiver is taken as input, including time-frequency two-dimensional spectral data, polarization and beam information, data of 19 beams of the FAST recorded at the same time is imported into a same directory as an input file, an astronomical standard fits file format is adopted, and parameters of spatial filtering are set. System noise is calibrated separately for the data of different beams, to eliminate the influence of the differences between different beams on the signals. The system noise may be calibrated by using a method for removing baselines, for example, asymmetric penalized least squares, in which an initial value is given, a difference between a fitted baseline and original data and smoothness of the baseline are calculated, parameters are updated, and a new baseline is calculated. The parameters may be updated by using a sigmoid function. The above calculation is repeated until the threshold is met or a maximum number of times of iteration is reached. After the calibration of the system noise, the files of all the beams are read at the same time, and the data is divided according to frequency channels. Calculation is performed separately for each channel. Specifically, each beam of the beam receiver is equivalent to a feed source, which receives signals in the sky at the same time. Taking the FAST as an example, 19 one-dimensional time sequences are obtained after sampling, fast Fourier transform is performed on each of the 19 time sequences to obtain signals of different frequency channels, thereby becoming 19 two-dimensional matrices (the vertical direction indicates time, and the horizontal direction indicates frequencies). The time indicates samples and the frequencies indicate channels. Data of a same frequency channel in 19 beams is extracted for subsequent calculation. The calculation is performed separately for each channel.

Then, an inter-beam covariance matrix of each channel is calculated, feature decomposition is performed thereon to obtain a signal eigenvector and an eigenvalue. The eigenvalue is signal energy in a corresponding signal direction. Components in the feature space that belong to the interference signal are found, and the interference subspace projection matrix is calculated by using the definition of projection in linear algebra, equivalent to constructing a spatial filter for the beam signals acquired. Specifically, the components in the feature space that belong to the interference signal are determined through the eigenvalues. An astronomical signal is very weak and is generally buried in noise, while the interference signal is very strong. When an interference signal exists, a maximum eigenvalue thereof may be many orders of magnitude higher than others. According to this characteristic, the components belonging to the interference signal are found from the feature space. Then, components in an interference subspace projection direction are subtracted from the inter-beam covariance matrix to obtain a spatially filtered inter-beam covariance matrix.

Finally, strength of each beam signal is recovered from the inter-beam covariance matrix. After the above steps are repeated for all the channels, complete filtered data is obtained, and is gathered and recombined to obtain the target reduction result. In this case, the target reduction result refers to the beam signal after the interference signal is removed.

It should be understood that, although the steps in the flowcharts involved in the above embodiments are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in the flowcharts involved in the above embodiments may include a plurality of steps or a plurality of stages. Such steps or stages are not necessarily performed at a same moment and may be performed at different moments. The steps or stages are not necessarily performed in sequence, and the steps or stages and at least some of other steps or steps or stages of other steps may be performed in turn or alternately.

Based on a same inventive concept, embodiments of the present disclosure further provide a radio astronomy interference signal reduction apparatus configured to implement the radio astronomy interference signal reduction as referred to above. The implementation solution for solving the problem provided by the apparatus is similar to the implementation solution described in the above method. Therefore, specific limitations in one or more embodiments of the radio astronomy interference signal reduction apparatus provided below may be obtained with reference to the limitations on the radio astronomy interference signal reduction method hereinabove. Details are not described herein again.

Figure 4:
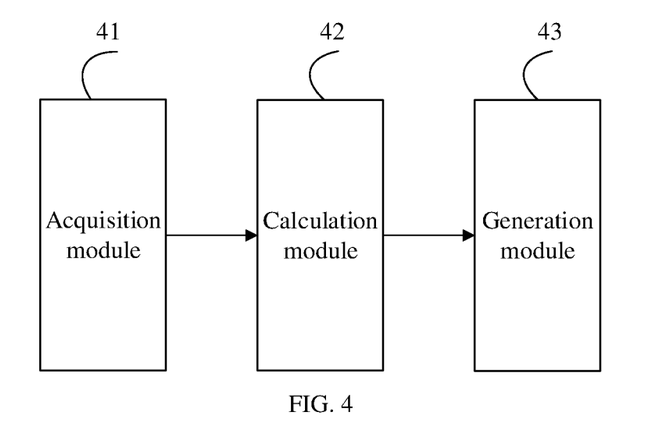
FIG. 4 is a structural block diagram of a radio astronomy interference signal reduction apparatus according to an embodiment.

In an embodiment, as shown in FIG. 4, a radio astronomy interference signal reduction apparatus is provided, including: an acquisition module 41, a calculation module 42, and a generation module 43.

The acquisition module 41 is configured to acquire at least two beam signals, and obtain a covariance matrix between all the beam signals according to the beam signals, wherein the beam signals include subsignals from at least two directions.

The calculation module 42 is configured to perform eigen-decomposition processing on the covariance matrix to obtain signal eigenvectors and eigenvalues corresponding to the subsignals, and extract interference eigenvectors corresponding to interference signals from the signal eigenvectors based on the eigenvalues.

The generation module 43 is configured to obtain a target reduction result for the interference signals according to the signal eigenvectors and the interference eigenvectors.

Specifically, taking the FAST as an example, the acquisition module 41 acquires 19 beam signals, and obtains a covariance matrix between the beam signals according to the beam signals. The beam signals include time-frequency two-dimensional spectral data, polarization and beam information. Various parameters of spatial filtering are set, including data processing time, a frequency, a polarization range, a result saving path, and the like. The acquisition module 41 sends the covariance matrix corresponding to the beam signals to the calculation module 42. The calculation module 42 performs eigen-decomposition processing on the covariance matrix to obtain signal eigenvectors and eigenvalues corresponding to signals in different directions, and extracts interference eigenvectors corresponding to interference signals from the signal eigenvectors according to the eigenvalues. Specifically, the astronomical signal is generally very weak and is buried in noise, generally having a small eigenvalue, while the interference signal is very strong. When interference exists, a maximum eigenvalue may be many orders of magnitude higher than others. Based on an obvious difference in characteristics between the astronomical signal and the interference signal, the interference signal is determined according to the eigenvalue. After extracting the interference eigenvectors corresponding to the interference signals, the calculation module 42 sends the interference eigenvectors and the signal eigenvectors to the generation module 43. The generation module 43 obtains a target reduction result for the interference signals according to the signal eigenvectors and the interference eigenvectors. The target reduction result is a spatially filtered inter-beam covariance matrix.

Through the above radio astronomy interference signal reduction apparatus, on the one hand, based on an obvious eigenvalue difference between the interference signal and the astronomical signal, the interference signal in the obtained beam signals can be quickly and efficiently identified and extracted, and the probability of error is small. On the other hand, in the prior art, generally, the interference signals in the data are identified and marked by consuming a lot of manpower, which may cause identification results of the interference signals to vary from person to person and may introduce artificial errors, resulting in inconsistency in marking results, while in the present disclosure, the identification of the interference signals based on manpower is completely abandoned, which solves the above errors caused by the introduction of the manpower, and realizes removal of the interference signals by using data from a plurality of beam signals, without affecting the astronomical signals, and can recover useful signals buried by interference to some extent, thereby preventing errors and data losses caused by human factors.

The modules in the above radio astronomy interference signal reduction apparatus may be implemented entirely or partially by software, hardware, or a combination thereof. The above modules may be built in or independent of a processor of a computer device in a hardware form, or may be stored in a memory of the computer device in a software form, so that the processor invokes and performs operations corresponding to the above modules.

Figure 5:
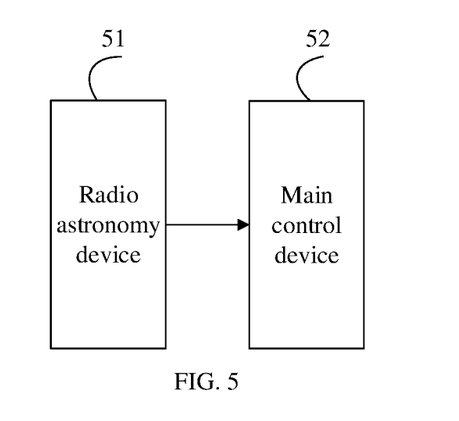
FIG. 5 is a structural block diagram of a radio astronomy interference signal reduction system according to an embodiment.

In an embodiment, a radio astronomy interference signal reduction system is provided. A structural block diagram of the radio astronomy interference signal reduction system is shown in FIG. 5. The system includes a radio astronomy device and a main control device. Specifically, The radio astronomy device being configured to receive at least two beam signals and transmit the beam signals to the main control device.

The main control device is configured to perform steps of any one of the radio astronomy interference signal reduction methods.

Specifically, after acquiring the beam signals transmitted by the radio astronomy device, the main control device obtains a covariance matrix between all the beam signals according to the beam signals; performs eigen-decomposition processing on the covariance matrix to obtain signal eigenvectors and eigenvalues corresponding to the signals in different directions, and extracts interference eigenvectors corresponding to interference signals from the signal eigenvectors based on the eigenvalues; and obtains a target reduction result for the interference signals according to the signal eigenvectors and the interference eigenvectors. The above main control device may be a server, a computer, a main control chip or other hardware devices configured to control the above radio astronomy interference signal reduction process. Further, the main control device may include a processor, a memory, and network interface connected by using a system bus. The processor of the main control device is configured to provide computing and control capabilities. The memory of the main control device includes a non-transitory storage medium and an internal memory. The non-transitory storage medium stores an operating system, a computer program, and a database. The internal memory provides an environment for running of the operating system and the computer program in the non-transitory storage medium. The database of the main control device is configured to store data of the radio astronomy interference signal reduction method. The network interface of the main control device is configured to communicate with an external terminal through a network connection. The computer program is executed by the processor to implement a radio astronomy interference signal reduction method. In some embodiments, the main control device may communicate with the radio astronomy device through a transmission device. In some other embodiments, the main control device may be directly integrated on the radio astronomy device.

In an embodiment, a computer device is provided. The computer device may be a terminal, and a diagram of an internal structure thereof may be shown in FIG. 6. The computer device includes a processor, a memory, a network interface, a display screen, and an input apparatus that are connected by using a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The communication interface of the computer device is configured to communicate with an external terminal in a wired or wireless manner. The wireless manner may be realized through WIFI, a mobile cellular network, near field communication (NFC), or other technologies. The computer program is executed by the processor to implement a radio astronomy interference signal reduction method. The display screen of the computer device may be a liquid crystal display screen or an electronic ink display screen. The input apparatus of the computer device may be a touch layer covering the display screen, or may be a key, a trackball, or a touchpad disposed on a housing of the computer device, or may be an external keyboard, a touchpad, a mouse, or the like.

Figure 6:
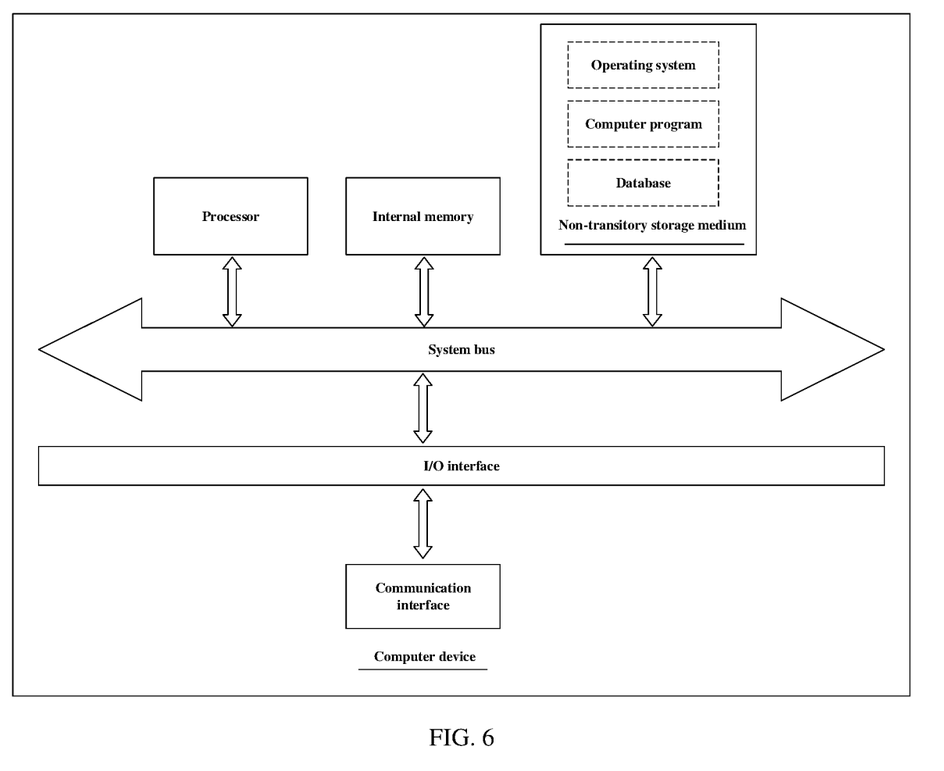
FIG. 6 is a diagram of an internal structure of a radio astronomy interference signal reduction computer device according to an embodiment.

Those skilled in the art may understand that, in the structure shown in FIG. 6, only a block diagram of a partial structure related to a solution of the present disclosure is shown, which does not constitute a limitation on the computer device to which the solution of the present disclosure is applied. Specifically, the computer device may include more or fewer components than those shown in the figure, or some components may be combined, or a different component deployment may be used.

Those skilled in the art should understand that the technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A radio astronomy interference signal reduction method, comprising:
    acquiring at least two beam signals, and obtaining a covariance matrix between all the beam signals according to the beam signals, wherein the beam signals comprise subsignals from at least two directions;
    performing eigen-decomposition processing on the covariance matrix to obtain signal eigenvectors and eigenvalues corresponding to the subsignals, and extracting interference eigenvectors corresponding to interference signals from the signal eigenvectors based on the eigenvalues;
    obtaining a target reduction result for the interference signals according to the signal eigenvectors and the interference eigenvectors.

2. The method of claim 1, wherein the interference eigenvectors form an interference subspace; and the obtaining the target reduction result for the interference signals according to the signal eigenvectors and the interference eigenvectors comprises:
    calculating an interference subspace projection matrix based on the interference subspace;
    performing projection transformation processing on the covariance matrix based on the interference subspace projection matrix to obtain a covariance projection matrix;
    subtracting the covariance projection matrix from the covariance matrix to obtain the target reduction result.

3. The method of claim 2, wherein the subtracting the covariance projection matrix from the covariance matrix to obtain the target reduction result comprises:
    subtracting the covariance projection matrix from the covariance matrix to obtain a spatially filtered covariance matrix;
    performing signal recovery processing based on the spatially filtered covariance matrix to obtain a de-interference beam signal, and obtaining the target reduction result based on the de-interference beam signal.

4. The method of claim 1, wherein the extracting the interference eigenvectors corresponding to the interference signals from the signal eigenvectors based on the eigenvalues comprises:
    acquiring a preset eigenvalue threshold;
    comparing each of the eigenvalues with the preset eigenvalue threshold, determining interference eigenvalues from the eigenvalues based on comparison results, and determining the corresponding interference eigenvectors from the signal eigenvectors based on the interference eigenvalues.

5. The method of claim 1, wherein the acquiring the at least two beam signals further comprises:
    acquiring at least two initial beam signals;
    performing system noise calibration processing on each of the initial beam signals to obtain the beam signals; wherein the system noise calibration processing comprises removing baselines in the beam signals.

6. The method of claim 1, wherein the beam signals comprise frequency information, and the obtaining the covariance matrix between all the beam signals according to the beam signals comprises:
    classifying the beam signals into at least one frequency channel according to the frequency information, and extracting frequency data corresponding to the frequency channel in the beam signals according to the frequency information; and inputting the frequency data into the corresponding frequency channel for calculation to obtain the covariance matrix.

7. The method of claim 1, wherein the acquiring the at least two beam signals further comprises:
    acquiring a preset time interval;
    acquiring the at least two beam signals based on the preset time interval.

8. A radio astronomy interference signal reduction apparatus, comprising:
    an acquisition module configured to acquire at least two beam signals, and obtain a covariance matrix between all the beam signals according to the beam signals, wherein the beam signals comprise subsignals from at least two directions;
    a calculation module configured to perform eigen-decomposition processing on the covariance matrix to obtain signal eigenvectors and eigenvalues corresponding to the subsignals, and extract interference eigenvectors corresponding to interference signals from the signal eigenvectors based on the eigenvalues;
    a generation module configured to obtain a target reduction result for the interference signals according to the signal eigenvectors and the interference eigenvectors.

9. A radio astronomy interference signal reduction system, comprising: a radio astronomy device and a main control device;
    the radio astronomy device being configured to receive at least two beam signals and transmit the beam signals to the main control device;
    the main control device being configured to perform steps of the method of claim 1.

10. A computer device, comprising a memory and a processor, the memory storing a computer program, wherein the processor, when executing the computer program, implements steps of the method of claim 1.

* * * * *